3,057,455
BALE-HANDLING MECHANISM
Harold E. de Buhr, Ottumwa, Iowa, assignor to Deere & Company, Moline, Ill., a corporation of Delaware
Original application Feb. 9, 1960, Ser. No. 7,718. Divided and this application Apr. 5, 1961, Ser. No. 100,986
3 Claims. (Cl. 198—128)

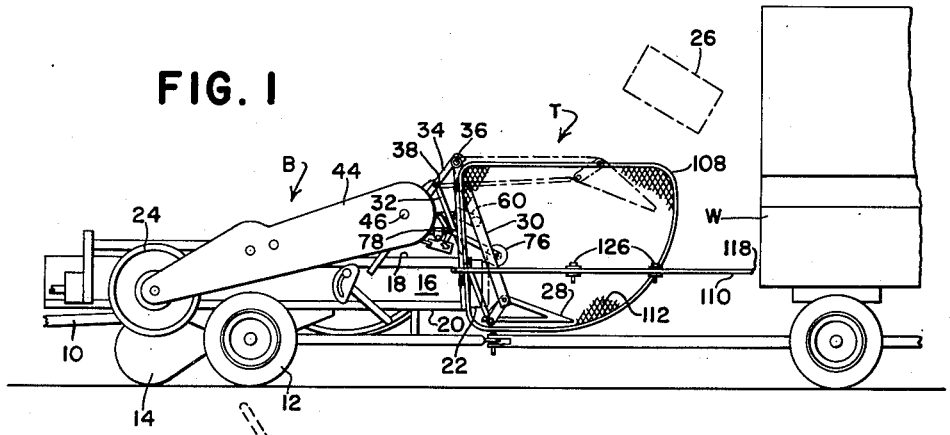
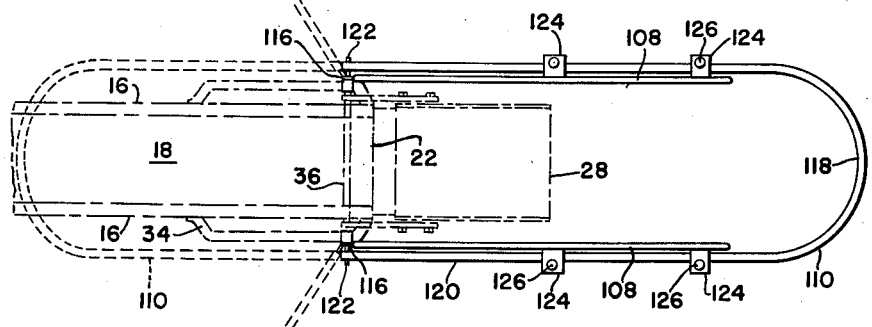
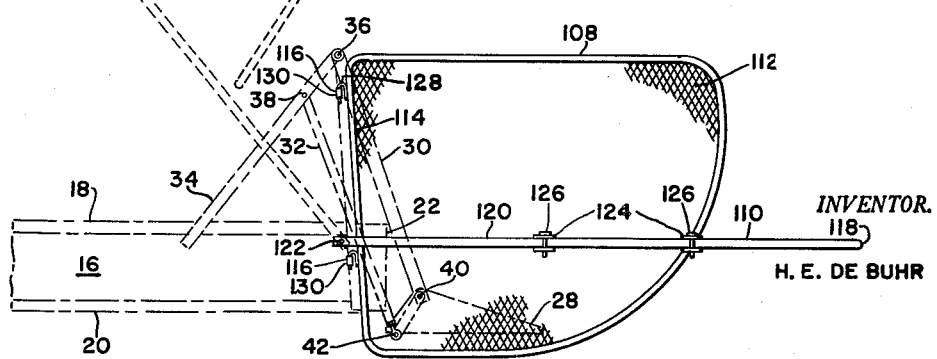
INVENTOR.
H. E. DE BUHR

United States Patent Office 3,057,455
Patented Oct. 9, 1962

This invention, the application for which is a division of copending application Ser. No. 7,718, filed February 9, 1960, relates to bale-handling mechanism and more particularly to that type of mechanism commonly known as a bale thrower, which is attachable to or mounted on the rear or equivalent discharge end of a typical agricultural baler of the pick-up type, whereby to facilitate and render substantially automatic the process of picking up hay, forming it into bales, and delivering the bales to a trailing wagon.

The forerunner of mechanism of this type is exemplified, for example, in the patent to Morrison 2,756,865, which features a pair of swingable arms mounted at the rear of the baler and equipped with gripper means for engaging opposite sides of an emerging bale and being powered by drive mechanism which swings the arms upwardly and rearwardly to traject the bale into the trailing wagon. The present invention features improvements in protective or safety means for bale throwers of the swinging arm type and has for its principal object the provision of an improved means, guard screens or grilles operative to protect those near the machine from injury by the swinging arms. It is a feature of the present invention to provide the safety means in such form that in normal position they permit observation of the machine but which may be easily swung out of such normal position to permit access to the throwing mechanism for adjustment, repair, etc.

The foregoing and other important objects and desirable features inherent in and encompassed by the invention will become apparent as preferred embodiments thereof are disclosed in detail in the accompanying description and appended drawings, the several figures of which are described below.

FIG. 1 is a small-scale elevation, with portions broken away, showing a typical vehicular train incorporating a baler, bale-handling mechanism and a trailing vehicle.

FIG. 2 is a plan, with portions of the baler and bale-handling mechanism shown schematically, illustrating a preferred form of guard or shield means for the bale-handling mechanism, broken lines illustrating what may be regarded as folded positions of the shields and guard.

FIG. 3 is an elevation of the structure shown in FIG. 2, dotted lines being again employed to illustrate the folded position of the guard.

In the vehicular train shown in FIG. 1, the baler is designated by the letter B, the bale-handling mechanism by the letter T and the trailing wagon by the letter W. The baler is of the typical pick-up type and may be drawn by a tractor (not shown), through the medium of a draft tongue 10 forming part of the baler main frame which is supported on ground wheels 12. The numeral 14 represents the pick-up mechanism which is operative to pick up previously harvested hay from windrows in the field and to cause this hay to move ultimately to a fore-and-aft bale case in which a bale chamber is defined by a plurality of walls, including opposite sides 16, a top 18 and a bottom or floor 20, the plurality of walls defining a rear rectangular discharge opening or portion represented generally by the numeral 22. Those familiar with the art will appreciate that bales are successively formed in the bale chamber by means of a reciprocating plunger (not shown) powered by means including a flywheel 24. Successive bales in the chamber are formed and tied and emerge successively past the rear discharge portion 22. A representative bale is shown in broken lines and is designated by the numeral 26.

Considered broadly, the bale-handling mechanism T comprises a receiver or receiving pan 28 normally or initially disposed adjacent to the bale discharge portion 22 and mounted by a pair of parallel links 30 and 32 on support means including a framework 34 which in turn is connected to the bale case walls. The pivots for the upper ends of the links 30 and 32 are provided at an upper part of the support and are transverse to the normal path of movement of the emerging bale 26 as it moves to the discharge portion 22. These pivots are designated respectively at 36 and 38. The lower ends of the links are pivotally connected respectively at 40 and 42 to the receiver 28. Drive mechanism, which may be of the type shown in the above-identified Morrison patent, as well as in the copending application, is controlled by suitable bale-sensing and control means, as shown in said patent and application, for causing the receiver 28 to swing from the loading position of FIGS. 1 and 3 to an unloading or discharging position as shown in broken lines in FIG. 1, whereupon the bale 26 is trajected to the wagon W as will be obvious, the front end of the wagon being open to receive the bale. In this manner, the baling operation is rendered substantially automatic, since the pick-up baler, which itself is primarily automatic, is augmented by the automatic bale-handling mechanism so that manual labor in handling bales between the baler and the wagon is eliminated.

The bale receiver 28 is of U-shaped cross section as seen from the front or rear and has opposite sides to which the pivotal connections 40 and 42 are made. It will be understood, of course, that there is another pair of arms 30 and 32 at the opposite side of the structure. The pivot 36 is established by a transverse shaft across the upper part of the supporting frame 34 which, as best seen in FIG. 2, is likewise composed of opposite sides rigidly connected to the baler. At this point, it should be noted that the bale-handling mechanism T could be provided as a separate unit towed behind the baler if desired. Consequently, the present mounting structure does not import any limitations into the invention. The arms 30 and 32 are, in their normal positions, as shown in FIG. 3, of sufficient length and so arranged as to geometry as to dispose the pan 28 in a loading position in which its floor is slightly below the discharge portion 22. The progress of the bale in moving from the discharge portion 22 to the receiver is a function of the formation of a succeeding bale as material is accumulated in successive charges, all as well known to those versed in the art, and ultimately the bale 26 will move rearwardly clear of the discharge portion 22 so as to drop onto or descend to the receiver 28. This principle, of causing the bale to clear the discharge portion 22 before the receiver is actuated, means that the receiver may be operated without intreference from any frictional forces that the baler may impart to the bale. In other words, the bale, when received by the receiver 28, is now entirely independent of the bale case. Moreover, as the receiver returns from its unloading position (broken lines in FIG. 1) it will pass clear of a succeeding emerging bale and consequently will not contact such bale as would be the case in some designs of the gripper-type of bale thrower. A still further advantage of this arrangement is that the descent of the bale onto the receiver is utilized to initiate mechanism for causing drive mechanism to function to swing the receiver between its loading and unloading positions and return.

For the purpose of deriving power from the baler, suitable drive means, which may be of any type (see above) and are therefore shown as being enclosed in a safety shield 44, are used to connect the flywheel 24 to a transverse shaft 46 appropriately journaled on the supporting frame 34. Since the flywheel 24 is constantly driven and the shaft 46 must be intermittently driven, it is necessary to provide in the drive mechanism a suitable clutch whereby the drive mechanism may be energized and de-energized. For this purpose, a typical one-revolution clutch (not shown) is utilized, as in the Morrison patent. Such clutch will include a constantly driven part (not shown) driven in the first instance from the flywheel 24 and an intermittently driven part (not shown) normally disengaged from the constantly driven part but connected thereto automatically at intervals to drive a pitman 60 connected to the arms or links 30. However, these particular details may be varied to suit individual desires.

When the receiver 28 is in its loading position, the clutch is disengaged and as is typical in one-revolution clutches, the clutch is automatically disengaged after one revolution, thereby discontinuing rotation of the shaft 46 while permitting the constantly rotating part to continue.

In the present case, the clutch is controlled by means which is made dependent upon the position of a bale 26 relative to the receiver 28. In other words, as long as the receiver 28 is in its loading position and is empty, the clutch is disconnected, whereby the drive mechanism, which includes the pitman 60, is de-energized. Therefore, the bale-handling mechanism or thrower T is idle, being normally arranged to await delivery thereto of the bale 26. Energizing and de-energizing of the drive mechanism depends upon bale-sensing and control means, including, among other portions to be described, a follower 76 which is pivoted at its forward end at 78 to the frame 34 and which extends rearwardly and downwardly, having at its rear end a roller or follower wheel in the path of emergence of the bale 26. Consequently, as the bale 26 emerges, the follower will be engaged by the bale and will ride the bale, being displaced from its initial position until ultimately as the bale 26 clears the discharge portion 22 and drops to the receiver 28, the clutch is engaged and the bale is thrown to the wagon. There is sufficient accelerative force in the drive mechanism to cause the bale 26 to be trajected to the wagon W, as shown in broken lines in FIG. 1. The timing of the clutch and the linkage represented by the pitman 60 and parallel links 30 and 32 is such that the receiver 28 will be returned to its loading position during one revolution of the clutch, at which time the clutch automatically disengages, a well-known characteristic of one-revolution clutches.

FIGS. 2 and 3 illustrate the machine equipped with protective means comprising a pair of side shields 108 and a guard 110. Each side shield is made up of a frame, preferably tubular, which carries an appropriate protective screen 112, and each frame is so shaped that it has a generally upright forward edge portion 114 which is mounted on the supporting frame 34 by upper and lower hinge means 116 which are coaxial on a generally vertical axis. In their normal positions, the shields respectively flank opposite sides of the mechanism T, in which positions they are maintained by cooperation with the guard 110, which is in the form of a U, having a bight 118 and opposite fore-and-aft legs 120. The forward end of each leg is proximate to the respective side of the supporting frame 34 and is pivoted there at 122, the pivots 122 being of course coaxial on a transverse horizontal axis. In normal position, the legs 120 of the guard 110 lies laterally outwardly of the respective shields 108 and the bight 118 is to the rear of the mechanism T. This establishes a protective means about the mechanism T so that during operation thereof persons standing or walking close thereto will not be injured.

The arrangement features provision for removability or folding of the shields and guards so that access may be had to the mechanism. For this purpose, the shields and guard are interconnected by releasable means, here comprising four U-shaped elements 124 rigidly secured respectively to the shields 108 and extending outwardly so as to receive or embrace proximate portions of the guard legs 120. Each element 124 has a removable pin 126 and the legs of the element are appropriately apertured to removably receive the pins. When the pins are in place, the three protective elements 108, 108 and 110 are securely maintained in the full-line positions shown in FIGS. 2 and 3. When the pins are removed, the shields 108 may be moved laterally inwardly sufficiently to free the elements 124 from the legs 120 of the U-shaped guard 110, and thereafter the guard may be swung forwardly and upwardly to the dotted-line position as indicated. Following this, the shields 108 may be swung laterally outwardly as indicated in dotted lines. Thus, the protective means has the advantage of being capable of occupying two positions, one its normal position in which the shields and guard are in place and the other a folded position in which the shields and guard provide access to the mechanism for adjustment and/or repair thereof. Each hinge 116 is of the type in which its pintle is a downwardly projecting releasable hook 128 upwardly separable from its cooperative socket 130, so that the entire shield may be removed if desired.

It will thus be seen from the foregoing that the improved bale-handling mechanism incorporates many novel features and that it may be provided as an attachment for the baler or may be designed to be an integral part of the baler, so that the mechanism may be sold as regular equipment or as an attachment. The simplicity of the design results in a relatively low-cost mechanism, besides one that is easy to operate, maintain and service.

Features of the invention other than those categorically enumerated will readily occur to those versed in the art, as will many modifications and alterations in the preferred embodiment of the invention disclosed, all of which may be achieved without departure from the spirit and scope of the invention.

What is claimed is:

1. In combination with a baler having a rear discharge portion at which successive bales are discharged, support means adjacent to said portion, and mechanism rearwardly of said portion and movable on the support means for receiving successive bales from said portion and for moving such bales remotely rearwardly: protective means for said mechanism, comprising a pair of upright fore-and-aft side shields normally positioned to respectively flank the mechanism at opposite sides thereof and respectively having front edge portions proximate to the support means; means hinging said front edge portions to the support means on respective upright axes for selective swinging of said shields laterally outwardly to afford access to said mechanism; means releasably retaining the shields in their normal positions; a U-shaped guard having a bight normally positioned at the rear of the mechanism and a pair of normally forwardly extending legs respectively alongside the shields, said legs respectively having forward portions proximate to the support means; means hinging said forward portions of the legs to the support means on a transverse axis for swinging of the guard out of its normal position to afford access to the mechanism;

and releasable means retaining the guard in its normal position.

2. The invention defined in claim 1, in which: the two releasable means are combined to afford cooperation thereof with both the guard and the shields.

3. The invention defined in claim 1, in which: the legs of the guard are respectively normally laterally outwardly of the shields whereby the guard when released is swingable upwardly and forwardly to clear the shields and the shield hinge means so as to enable the shields thereafter to be swung laterally outwardly.

References Cited in the file of this patent

UNITED STATES PATENTS

| | | |
|---|---|---|
| 2,756,865 | Morrison | July 31, 1950 |
| 2,785,811 | Forth | Mar. 19, 1957 |
| 2,892,549 | Andrus | June 30, 1959 |